(No Model.)

G. H. MEYER.
CORN PLANTER.

No. 311,351. Patented Jan. 27, 1885.

WITNESSES:
Gustave Dieterich
Fred Huetwohl

INVENTOR:
G. H. Meyer
BY Munn & Co
ATTORNEYS.

UNITED STATES PATENT OFFICE.

GEORGE HOMER MEYER, OF SANTA ROSA, CALIFORNIA.

CORN-PLANTER.

SPECIFICATION forming part of Letters Patent No. 311,351, dated January 27, 1885.

Application filed April 14, 1884. (No model.)

*To all whom it may concern:*

Be it known that I, GEORGE HOMER MEYER, of Santa Rosa, in the county of Sonoma and State of California, have invented a new and Improved Corn-Planter, of which the following is a full, clear, and exact description.

Reference is to be had to the accompanying drawings, forming part of this specification, in which similar letters of reference indicate corresponding parts in all the figures.

Figure 1:
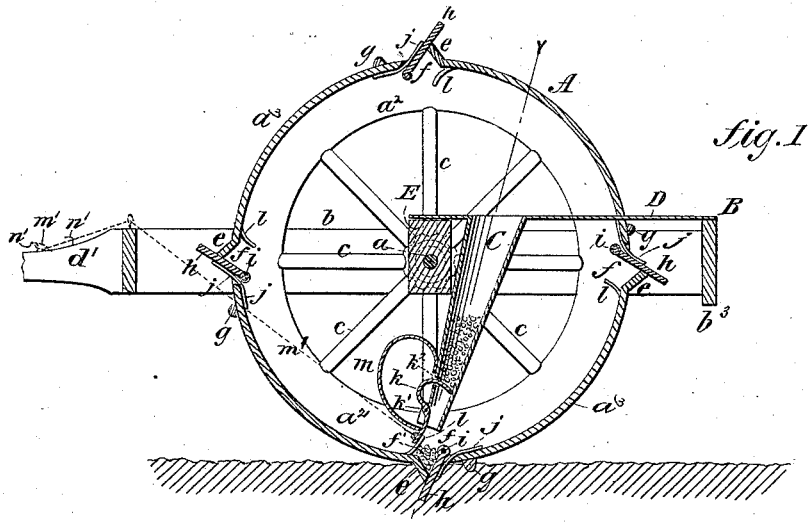
Figure 2:
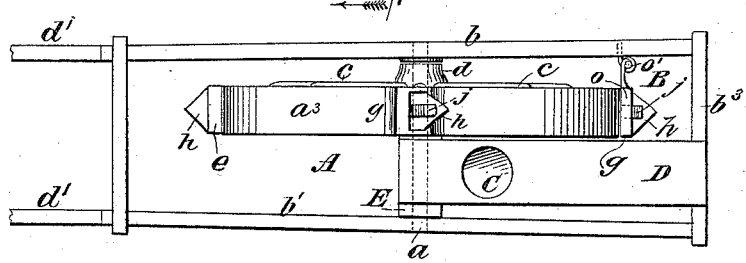
Figure 3:
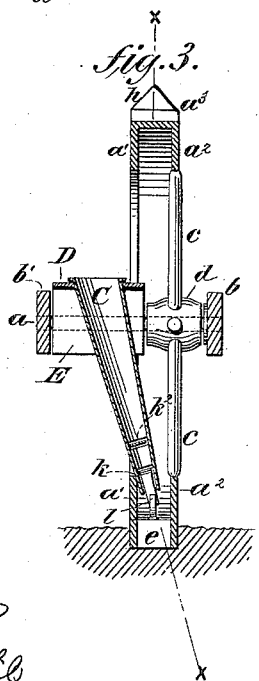

Figure 1 is a sectional elevation of my new and improved corn-planter, taken on the line $x\ x$ of Fig. 3. Fig. 2 is a plan view thereof, and Fig. 3 is a transverse sectional elevation of the planter, taken on the line $y\ y$ of Fig. 1.

The invention will first be described in connection with the drawings, and then pointed out in the claims.

Referring to the drawings, A represents a broad wheel, about sixteen feet in circumference, placed upon the axle $a$, which is journaled in the side pieces, $b\ b'$, of the wooden frame B. By preference the wheel A is made hollow—that is, with the inwardly-projecting flanges $a'$ and $a^2$, the latter of which is secured to the spokes $c\ c$, which reach out from the hub $d$, so that the main body of the wheel A runs to one side of a central transverse plane passing through the hub $d$, as shown clearly in Fig. 3. At four places equidistant from each other, the tire or rim $a^3$ of the wheel A is formed with the outwardly-projecting lip $e$ and opening $f$, and just back of the opening $f$, with the covering lip or projection $g$. In the openings $f$ are placed the pointed plates $h$. These are pivoted at $i$ to and between the flanges $a'\ a^2$, and reach out beyond the tire or rim $a^3$, and are for opening the ground to receive the seed. Normally the plates $h$ are held closed or pressed forward against the outer edges of the lips $e$ by the springs $j$, attached to the tire or flange $a^3$, so as to act against the said plates. When in this closed position the plates $h$, together with the lips $e$, form V-shaped seed-pockets, to receive from the hopper or seed-box C above a small quantity of seed, ready for dropping the same into the openings made in the ground by the said lips $e$ and plates $h$, as illustrated at $f'$, Fig. 1. The hopper or seed-box C is by preference funnel-shaped, and is held in the plate D, secured at one end to the cross-piece $b^3$ of the frame B, and at the other end to the block E, placed upon the axle $a$ between the wheel-hub $d$ and the side piece, $b'$, of the frame B. The lower end of the hopper C reaches down between the flanges $a'\ a^2$, near to the inner surface of the rim $a^3$ of the wheel A, and is closed at its lower end by the narrow strip of metal $k$, which is pivoted at $k'$, and reaches below the lower end of the hopper C, and is bent or shaped so that it forms a double-acting valve, its upper end working through the slot $k^2$ in the hopper in such manner as to adapt it to measure out from the hopper C the quantity of seed to be dropped into each hill. The lower end of the valve-plate $k$ is kept closed by the spring $m$, except while the spring-lips $l$, secured to the inner surface of the rim $a^3$ of the wheel A, just in front of the lips $e$, are passing the lower end of the hopper C, when the valve-plate $k$ will be turned upon its pivot $k'$ by lips $l$, causing its lower end to open and its upper end to close the lower end of the hopper C, thus permitting the requisite quantity of seed that is contained between the upper and lower end of the valve $k$ to drop into the V-shaped pocket formed by the lip $e$ and plate $h$, as will be understood from Fig. 1. The side pieces, $b\ b'$, of the frame B, in this instance, are extended to form handles $d'\ d'$, by which the planter may be conveniently rolled by hand before the operator along the ground to plant to the seed.

The operation of the planter is as follows: As the wheel A revolves, the four lips $e$ and plates $h$ successively come down to and enter the ground a proper distance apart, the plates $h$ entering the ground before the lips $e$. The pressure of the soil in the first instance upon the plates $h$ keeps these plates closed on entering the ground; but as the wheel continues to turn, and consequently lifts the lips $e$ and plates $h$ out of the ground, the plates $h$, being deeper in the ground than the lips $e$, will naturally remain in the ground longer than the lips $e$, which causes the plates $h$ to open for an instant before being drawn entirely out of the ground. At this time one of the spring-lips $l$ passes the lower end of the valve $k$, operating it, thus permitting a small quantity of seed to drop from the hopper C between the lip $e$ and plate $h$, which latter, now being open, permits the seed to drop into the opening made in the ground by the said lip *e* and plate *h*. That part of the plates *h* which enters the ground may be slightly concaved, and, being pointed, cannot by any accident cause the seed to scatter out of the openings made by the plates *h* and lips *e*, and the lugs or projections *g* cause the soil to bank up between them and the backs of the plates *h*, so that as the wheel A passes on the soil thus banked up will fall into and fill the openings made by the lips and plates, and thus cover the seed.

Although I have shown and described my invention as applied for a hand-planter, it is obvious that the same principles may be employed for a horse-planter with several wheels and dropping and covering mechanisms acting substantially as above described.

In taking the planter to and from the field, or in rolling it from one part of the field to another, the valve *k* may be held tightly closed to prevent any seed from escaping from the hopper C by drawing upon the cord *m* and shifting the ring *m'* thereof from the hook *n* to the hook *n'*, which will hold the valve *k* out of action and in such position as to close the hopper C, as will be understood from Fig. 1; and to prevent accumulation of dirt upon the tire *a³* of the wheel A, I provide the scraper *o*, which is attached to the side bar, *b*, by the spring *o'*, which allows the scraper to bend back easily to permit the plates *h*, lips *e*, and projections *g* to pass the scraper, the scraper at all other times running in contact with the wheel, so as to clear it of dirt. There may be a scraper at both sides of the wheel, if desired.

Having thus described my invention, what I claim as new, and desire to secure by Letters Patent, is—

1. The wheel A, formed with the seed-openings *f* and penetrating lips *e*, plates *h*, projecting beyond said lips and penetrating the ground, and springs *j*, acting to close said plates upon emerging from the ground, substantially as and for the purposes set forth.

2. The plates *h*, pivoted in the seed-openings *f*, and arranged to open and close the same, and to penetrate the ground to actuate said plates by the action of the resisting earth, substantially as and for the purposes set forth.

3. The wheel A, formed with the openings *f* and lips *e*, in combination with the plates *h*, pivoted in the openings *f*, and projecting beyond said lips, substantially as and for the purposes set forth.

4. The wheel A, formed with the openings *f*, lips *e*, and covering projections *g*, in combination with the plates *h*, pivoted in the openings *f*, substantially as and for the purposes set forth.

5. The hopper C, having the double-acting valve *k*, pivoted at its lower end, in combination with the wheel A, having finger *l*, arranged in front of the openings *f*, substantially as and for the purposes set forth.

GEO. HOMER MEYER.

Witnesses:
JAMES H. McGEE,
WILLIAM F. RUSSELL.